(12) United States Patent
Balliet

(10) Patent No.: US 9,126,315 B2
(45) Date of Patent: Sep. 8, 2015

(54) STRIP ALL WINDOW AND SCREEN REMOVAL TOOL

(76) Inventor: James Leroy Balliet, Perkasie, PA (US)

( * ) Notice: Subject to any disclaimer, the term of this patent is extended or adjusted under 35 U.S.C. 154(b) by 926 days.

(21) Appl. No.: 12/702,408

(22) Filed: Feb. 9, 2010

(65) Prior Publication Data

US 2010/0199478 A1    Aug. 12, 2010

Related U.S. Application Data

(60) Provisional application No. 61/150,990, filed on Feb. 9, 2009.

(51) Int. Cl.
 B25B 27/00    (2006.01)
 E05B 19/20    (2006.01)
 B23P 19/04    (2006.01)

(52) U.S. Cl.
 CPC ......... *B25B 27/0092* (2013.01); *B25B 27/0028* (2013.01); *B23P 19/047* (2013.01); *E05B 19/20* (2013.01); *Y10T 29/49815* (2015.01); *Y10T 29/53943* (2015.01)

(58) Field of Classification Search
 CPC . E05B 19/20; B25B 27/0028; B25B 27/0092; B23P 19/047; Y10T 29/49815; Y10T 29/53943
 USPC ............. 81/3.27, 3.55, 3.47, 3.57, 15.9, 3.09, 81/488; 29/235
 See application file for complete search history.

(56) References Cited

U.S. PATENT DOCUMENTS

| | | | | |
|---|---|---|---|---|
| 118,823 | A * | 9/1871 | Smade | 81/8.1 |
| 2,455,496 | A * | 12/1948 | Kaskouras | 30/413 |
| 2,503,683 | A * | 4/1950 | Perkins | 81/3.55 |
| 3,103,047 | A * | 9/1963 | Wolf, Jr. | 24/376 |
| 3,204,907 | A * | 9/1965 | Tattrie | 248/211 |
| D206,092 | S * | 10/1966 | Steck | D8/16 |
| 3,508,319 | A | 4/1970 | Boyer | |
| 3,858,301 | A * | 1/1975 | Tesone | 29/278 |
| 3,965,720 | A | 6/1976 | Goodwin | |
| 4,213,215 | A * | 7/1980 | Hall | 7/152 |
| 4,813,120 | A * | 3/1989 | Fournier | 29/426.6 |
| 5,220,701 | A | 6/1993 | Creato | |
| 5,568,665 | A * | 10/1996 | Fick | 7/105 |
| 5,695,171 | A * | 12/1997 | Shine | 254/25 |
| 6,786,472 | B1 * | 9/2004 | Dahl | 254/25 |
| 7,039,993 | B1 * | 5/2006 | Smith et al. | 29/235 |
| 7,147,209 | B2 * | 12/2006 | Jones et al. | 254/25 |
| 7,562,687 | B2 * | 7/2009 | Werner | 157/1.3 |
| 7,735,806 | B2 * | 6/2010 | Prater et al. | 254/25 |
| 7,996,971 | B2 * | 8/2011 | Newton | 29/243.55 |
| 8,365,378 | B1 * | 2/2013 | Lenart | 29/253 |
| 2008/0127473 | A1 * | 6/2008 | Yu | 29/267 |

* cited by examiner

*Primary Examiner* — Jason L Vaughan
(74) *Attorney, Agent, or Firm* — Kenneth Bower; Lyman Smith

(57) ABSTRACT

A hand tool for removing flexible strips used to retain windows and screens onto doors. Each of the two blades of the strip all is optimized for use in removing one of the two flexible strip designs currently in use. The geometry of each blade is designed for ease of use and to protect the door, window, screen or operator from damage.

10 Claims, 4 Drawing Sheets

STRIP ALL WINDOW AND SCREEN REMOVAL TOOL

CROSS-REFERENCE TO RELATED APPLICATIONS

This application hereby claims priority to provisional application No. 61/150,990 filed on Feb. 9, 2009 and titled "STRIP ALL WINDOW SCREEN REMOVAL TOOL".

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

TECHNICAL FIELD

The present invention is in the field of hand tools used in the maintenance and repair of buildings.

BACKGROUND OF THE INVENTION

Windows and screens are often retained in the openings of outer doors of buildings by flexible retaining strips. The present invention optimizes the tools that are used for removal of the two most commonly used flexible retaining strip designs and locates each tool at the opposite ends of a common handle for convenience. The present invention is unique in that it is a hand tool for removal of window or screen retaining strips having a single "C" channel shaped handle and a narrow blade lying in a plane that is essentially orthogonal to the center line of the handle and having a distal end located at the center line extending from the handle in a first direction and a wide blade lying in a plane that is essentially orthogonal to the center line of the handle having a distal end at the same center line and extending from the handle in a direction opposite to the first direction.

PRIOR ART

Prior art discloses inventions that have similar features but do not disclose nor make obvious the combination of structure and application of the present invention.

One such disclosure is within the patent to Goodwyn et al. (U.S. Pat. No. 3,965,720) which discloses a hand tool having a single flat handle with a center line and a blade extending from the handle in a first direction and an identical blade extending from the handle in a direction opposite to the first direction. Goodwyn et al. lacks application to the removal of window or screen retaining strips lacks a "C" channel shaped handle and lacks a narrow blade lying in a plane that is essentially orthogonal to the center line having a distal end at the center line extending from the handle and also lacks a wide blade lying in a plane that is essentially orthogonal to the center line having a distal end at the center line.

The patent to Boyer (U.S. Pat. No. 3,508,319) discloses a hand tool for removing windshield molding having a single flat handle with a center line and a first blade extending from the handle in a first direction and a blade being a mirror image of the first blade extending from the handle in a direction opposite to the first direction. Boyer lacks a "C" channel shaped handle and lacks a narrow blade lying in a plane that is essentially orthogonal to the center line having a distal end at the center line extending from the handle and also lacks a wide blade lying in a plane that is essentially orthogonal to the center line having a distal end at the center line.

The patent to Creato et al. (U.S. Pat. No. 5,220,701) discloses a hand tool having a single "C" channel shaped handle and blades extending from both ends that can be applied to removal of window putty as shown in FIG. 1. However, Creato et al. lacks a narrow blade lying in a plane that is essentially orthogonal to the center line having a distal end at the center line extending from the handle in a first direction and also lacks a wide blade lying in a plane that is essentially orthogonal to the center line having a distal end at the center line and extending from the handle in a direction opposite to the first direction.

BRIEF DESCRIPTION OF THE INVENTION

The present invention is intended for removal of two types of trim that are used to hold windows or screens into doors. Use of screw drivers as often recommended by the manufacturer can result in injury to the trim, screen, window, door or even the user. The user must also have at least two size screw drivers to complete the operation. The present invention has blades appropriate for use with two different trim designs on one tool for convenience. Also, the blades are oriented to protect the trim, screen, window, door and user and provide sufficient mechanical advantage to perform the operation conveniently and with little effort. The handle is also formed as a "C" shaped channel to provide comfort and prevent blistering to the hands of the user as well as providing stiffness to the tool. The distal end of the blades is also kept at or near the center line of the handle to eliminate undesirable twisting of the tool in the hand when pulling or prying force is applied.

DETAILED DESCRIPTION OF THE INVENTION

Figure 1:
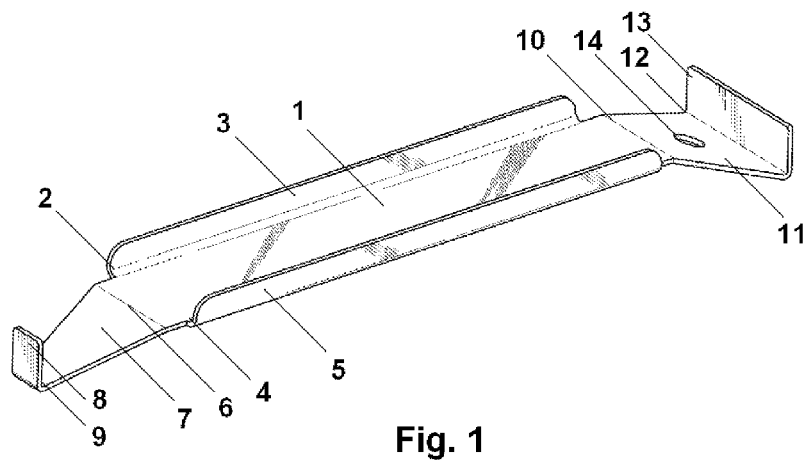
FIG. 1: Is a perspective view of the present invention.

FIG. 1 shows the preferred embodiment of the apparatus of the present invention. A handle, shaped as a "C" channel, is comprised of handle body 1 and wing portions 3 and 5 which are connected to handle body 1 by first bend 2 and second bend 4 respectively. Handle body 1 is elongated at the left end in FIG. 1 by narrow extension 7 that is connected to handle body 1 with a third bend 6. The distal end of narrow extension 7 is formed by fourth bend 9 that ends in narrow blade 8. Handle body 1 is elongated at the right end of FIG. 1 by wide extension 11 that is connected to handle body 1 with fifth bend 10. The distal end of wide extension 11 formed by sixth bend 12 that ends in wide blade 13.

Figure 2:
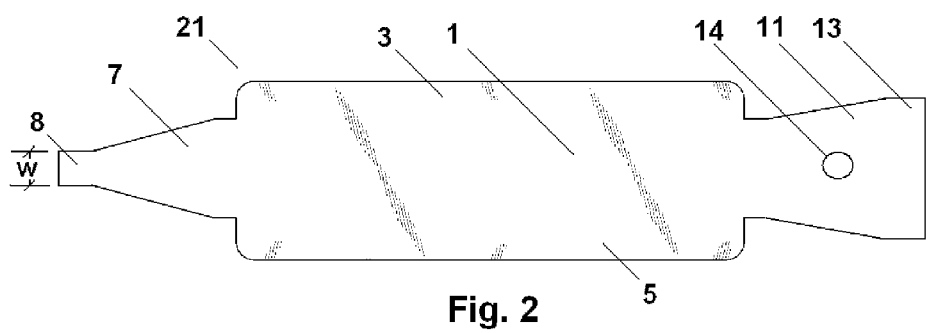
FIG. 2: Is a plan view of the present invention.

FIG. 2 is a plan view of a sheet metal blank 21 that is further processed to produce the apparatus of the preferred embodiment of the present invention. The parts of sheet metal blank 21 are handle body 1, wing portions 3 and 5, narrow extension 7, narrow blade 8 wide extension 11, wide blade 13 and hole 14. The dimension that is referred to as width is indicated as "w".

Figure 3:
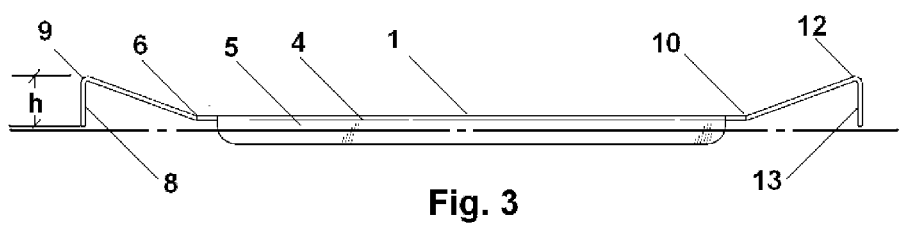
FIG. 3: Is a side view of the present invention.

FIG. 3 shows a side view of the apparatus for the preferred embodiment of the present invention. The following bends may be made in any order may be combined in any combination of bending or forming operations or made separately. Wing 5 is bent downward in bend 4, wing 3 is similarly bent downward in bend 2 (un-shown). Narrow extension 7 is bent upward at bend 6 and downward at bend 8. Wide extension 11 is bent upward at bend 10 and downward at bend 12. The dimension that is referred to as height is indicated with "h".

Figure 4A:
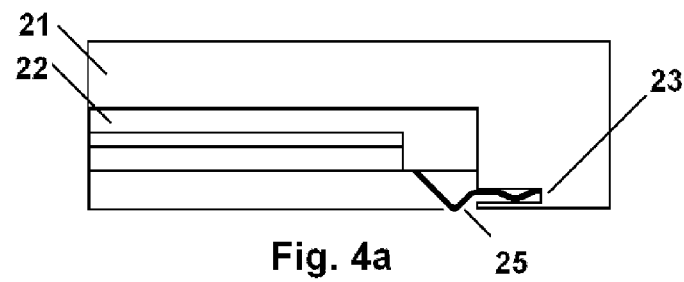
FIG. 4a: Is a top sectional view of angle ended trim holding a screen in a door.
Figure 4B:
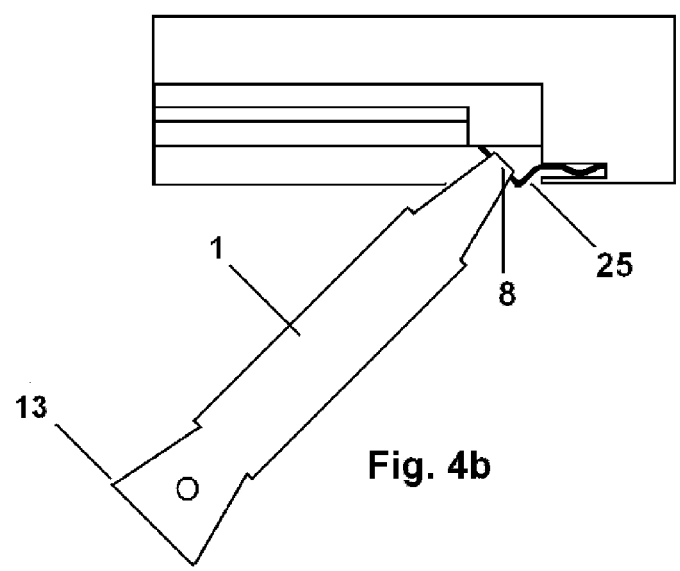
FIG. 4b: Is the present invention removing the trim from the door of FIG. 4a
FIG. 4c: is a plan view of FIG. 4b
FIG. 5a: Is a top sectional view of square ended trim holding a screen in a door
Figure 4C:
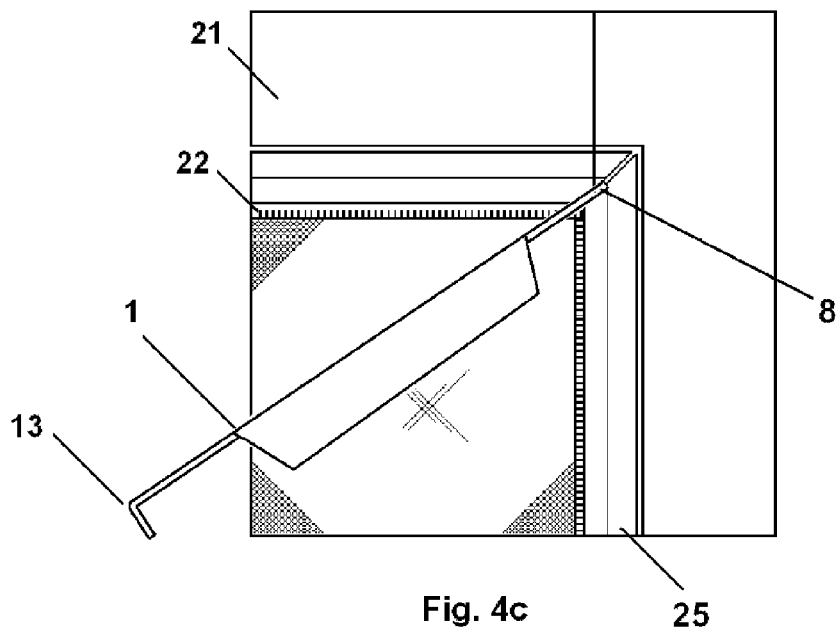

FIG. 4a shows a screen or window 22 being held onto door 21 with an angled ended retaining member 25. FIGS. 4b and 4c show how the small blade 8 of the apparatus of the present invention is inserted between the angle ended retaining members 25 in preparation for the removal methods of FIG. 6.

Figure 5A:
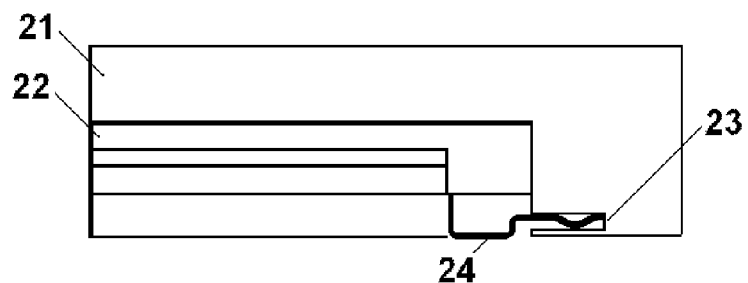
FIG. 5b: Is the present invention removing the trim from the door of FIG. 5a
FIG. 5c: is a plan view of FIG. 5b
FIG. 6: Is a block diagram of the method of use of the present invention.
Figure 5B:
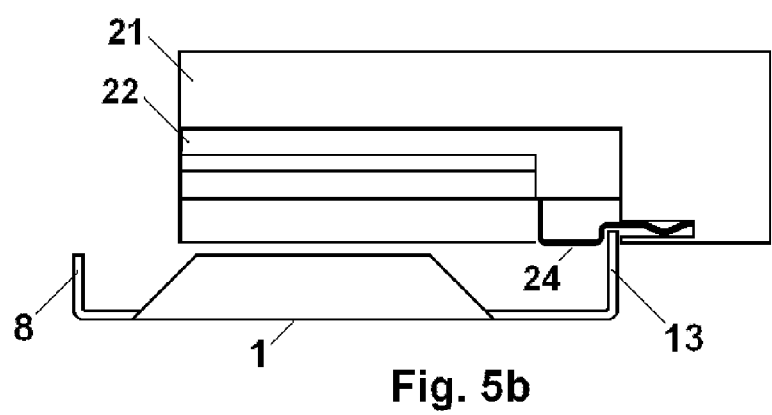
Figure 5C:
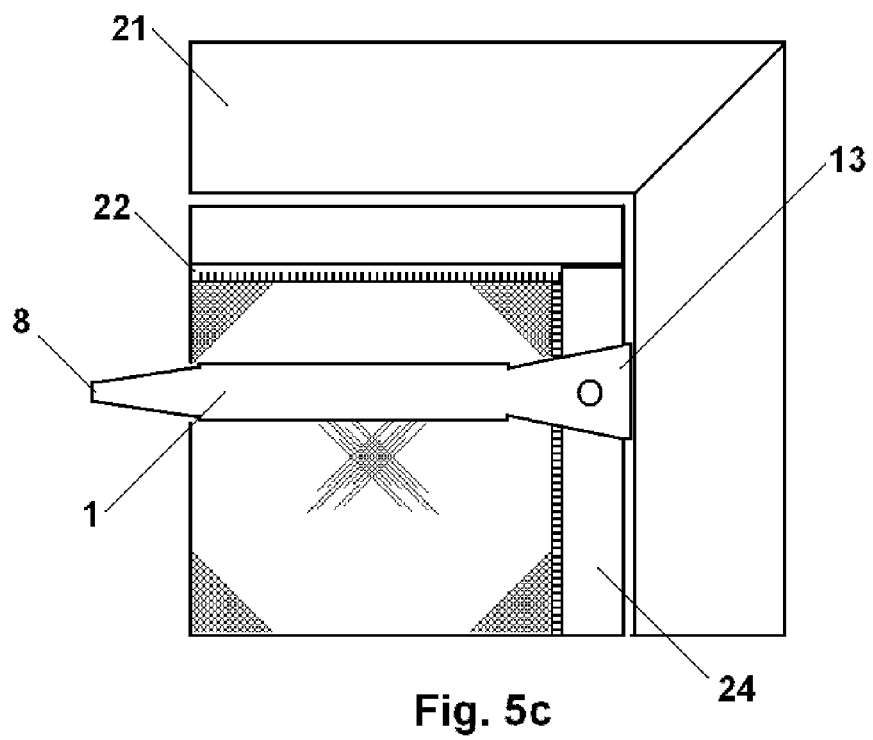

FIG. 5a shows a screen or window 22 being held onto a door 21 with a square ended retaining member 24. The wide blade 13 of the apparatus of the present invention is inserted between the square ended retaining member and the and the door 21 as shown in FIGS. 5b and 5c in preparation for the removal methods of FIG. 6.

Figure 6:
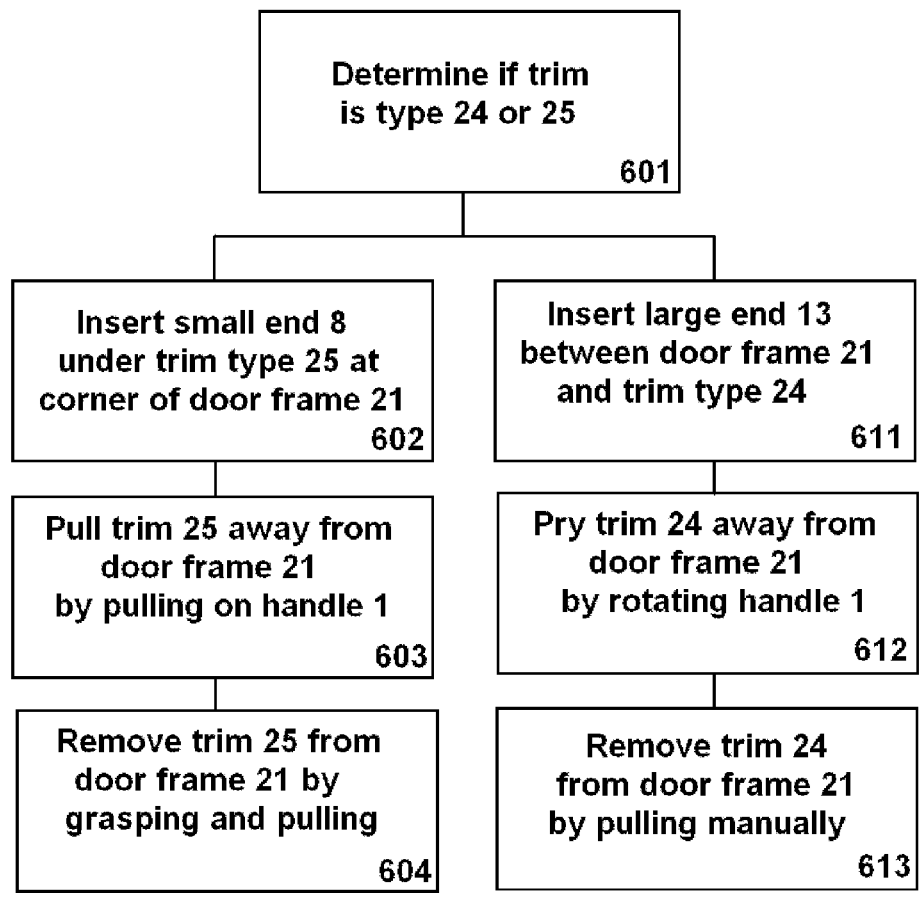

FIG. 6 shows a block diagram for the method of using the apparatus of the present invention. Step 601 is completed by observation of the retaining members at the corner of the door. If the retaining members are angled at the corner they are type 25 and the process continues at step 602. If the retaining members are cut squarely at the corner of the door they are type 24 and the process continues at step 611.

Step 602 calls for inserting the small blade 8 of the apparatus of the present invention to be inserted behind retaining member 25. The handle of the apparatus of the present invention is then pulled away from the frame of door 21 by pulling on the handle member 1 per method step 603. Removal of the retaining member is completed manually by grasping the retaining member 25 in ones hand and manually pulling per method step 604. Step 611 calls for inserting the apparatus of the present invention between the door frame and square ended retaining member 24 and the edge of door 21. The retaining member 24 is separated from the door frame with a downward motion of the handle member 1 thereby prying the retaining member 24 from the edge of the door 21 per method step 612. Removal of the retaining member is completed manually by grasping the retaining member 24 in ones hand and manually pulling per method step 613.

I claim:

1. A tool for removal of window or screen retainers formed from a single piece of sheet metal comprising:
    a center portion of the single piece of sheet metal formed into a handle with two right angle bends one right angle bend along each of a two parallel edges of the single piece of sheet metal forming a "C" shaped channel;
    an axis through the geometric center of the handle and parallel to the two right angle bends, the axis being in a plane formed by the handle between the two right angle bends;
    a first extension extending from a first end of the handle at an essentially twenty degree angle from the axis;
    a first blade extending from the first extension at an angle of essentially one hundred ten degrees in a direction towards the axis;
    a second extension extending from a second end of the handle at an essentially twenty degree angle from the axis; and
    a second blade extending from the second extension at an angle of essentially one hundred ten degrees in a direction towards the axis, wherein the height and the width of the first blade border an area forming a first plane;
    the first plane is essentially orthogonal to the axis;
    the distal end of the first blade, relative to the handle, has a thickness, a width essentially eight times greater than the thickness and a height essentially eleven times greater than the thickness;
    the distal end of the second blade, relative to the handle, has a thickness, a width essentially thirty times greater than the thickness and a height essentially eleven times greater than the thickness;
    the height and the width of the second blade border an area forming a second plane; and
    the second plane is essentially orthogonal to the axis.

2. The tool of claim 1 wherein the second blade includes a through hole for suspending the tool when not in use.

3. A tool for removal of window or screen retainers formed from a single piece of sheet metal comprising:
    a center portion of the single piece of sheet metal formed into a handle with two bends—one bend along each of a two edges of the single piece of sheet metal forming a "C" shaped channel;
    an axis through the geometric center of the handle and parallel to the two bends;
    a first extension extending from a first end of the handle at a first extension angle away from the axis;
    a first blade extending from the first extension at a first blade angle toward the axis;
    a second extension extending from a second end of the handle at a second extension angle extending away from the axis;
    a second blade extending from the second extension at a second blade angle,
    wherein the height and the width of the first blade border an area forming a first plane;
    the first plane essentially orthogonally intersects orthogonal to the axis;
    the height and the width of the second blade border an area forming a second plane; and
    the second plane essentially orthogonally intersects orthogonal to the axis.

4. The tool of claim 3, wherein the two bends are right angle bends.

5. The tool of claim 3, wherein the first extension angle is essentially a twenty degree angle from the axis.

6. The tool of claim 3, wherein the first blade angle is essentially a one hundred ten degree angle in a direction towards the axis.

7. The tool of claim 3, wherein the second extension angle is essentially a twenty degree angle from the axis.

8. The tool of claim 3, wherein the second blade angle is essentially a one hundred ten degree angle in a direction towards the axis.

9. The tool of claim 3, wherein a distal end of the first blade, relative to the handle, has a thickness, a width essentially eight times greater than the thickness and a height essentially eleven times greater than the thickness.

10. The tool of claim 3, wherein the distal end of the second blade, relative to the handle, has a thickness, a width essentially thirty times greater than the thickness and a height essentially eleven times greater than the thickness.

* * * * *